United States Patent [19]
Yoshikawa et al.

[11] Patent Number: 5,375,747
[45] Date of Patent: Dec. 27, 1994

[54] PULVERULENT MATERIAL FEEDER APPARATUS

[76] Inventors: Osamu Yoshikawa, 2-713 Higasi-ohshoji-choh, Sendai City, Kagoshima Pref.; Hirofumi Yoshikawa, 1-2274 Miyauchi-choh, Sendai City, Kagoshima Pref., both of Japan

[21] Appl. No.: 15,802

[22] Filed: Feb. 10, 1993

[30] Foreign Application Priority Data

Dec. 28, 1992 [JP] Japan ............ 4-089207[U]

[51] Int. Cl.$^5$ ............................................. B65G 65/48
[52] U.S. Cl. .............................. 222/410; 239/689; 414/325
[58] Field of Search ............ 239/681, 687–689; 406/66, 133, 132; 222/370, 410, 561; 198/526, 530, 532, 535, 536, 802.16; 414/304, 325

[56] References Cited

U.S. PATENT DOCUMENTS

| | | | |
|---|---|---|---|
| 396,251 | 1/1889 | Adamson | 239/688 |
| 3,420,451 | 1/1969 | Kahlbacher | 239/689 |
| 4,361,254 | 11/1982 | Teraoku et al. | 222/410 |
| 4,386,719 | 6/1983 | Serizawa | 239/689 |
| 4,653,674 | 3/1987 | Kihara et al. | 222/410 |

FOREIGN PATENT DOCUMENTS

| | | | |
|---|---|---|---|
| 53-49169 | 11/1978 | Japan . | |
| 56-21701 | 5/1981 | Japan . | |
| 58-23795 | 5/1983 | Japan . | |
| 190120 | 12/1966 | U.S.S.R. | 239/688 |

*Primary Examiner*—Karen B. Merritt
*Attorney, Agent, or Firm*—Wenderoth, Lind & Ponack

[57] ABSTRACT

A pulverulent material feeder apparatus includes a bottom plate extending horizontally and inner and outer cylinders disposed on the bottom plate in a coaxial relation. These cylinders define therebeween a material transporting space. A material extruding gap is formed between a lower edge of the inner cylinder and the bottom plate. The apparatus further includes a rotatable annular member connected to a rotatable shaft mounted at the coaxial center by means of spokes so that the annular member is disposed along the inner periphery of the outer cylinder and a gap adjusting cylinder which is disposed along the outer periphery of the inner cylinder and adapted to be adjusted with respect to the vertical position thereof for thereby making it possible to adjust the size of the extruding gap. The gap adjusting cylindrical member is formed spirally substantially over a whole circumference thereof with an inclination relative to the plane of the bottom plate so that the material extruding gap is minimum at a position adjacent to the material discharge port and is progressively enlarged, starting from the minimum gap portion, in a direction in which the spokes are rotated. The bottom plate may be formed in a cone-like configuration having a center portion protruding upwardly and a lower periphery so that a pulverulent material charged into the inner cylinder can be expelled radially outwardly to the last bit by sliding downwardly on and along the bevelled surface of the bottom plate.

4 Claims, 4 Drawing Sheets

PULVERULENT MATERIAL FEEDER APPARATUS

BACKGROUND OF THE INVENTION

1. Field of the Invention

The present invention relates generally to a pulverulent material feeder apparatus. More particularly, the present invention is concerned with a pulverulent material feeder apparatus which includes an inner cylinder and an outer cylinder disposed coaxially on a bottom plate and in which a pulverulent material such as powder, pulverized materials, particles or the like heaped at an angle of rest is expelled or extruded radially and outwardly from the inner cylinder through a gap defined underneath a lower edge of the inner cylinder, whereupon the pulverulent material is then discharged from a discharge port while being transported by means of revolving scraping members or blades at a substantially constant discharge or feed rate.

2. Description of the Prior Art

In the pulverulent material feeder apparatus known heretofore, an annular space for transportation of a pulverulent material is defined between an outer cylinder and an inner cylinder disposed coaxially with each other, wherein a gap of a constant height is formed between a bottom plate of the outer cylinder and a lower edge of the inner cylinder so that a pulverulent material charged into the inner cylinder and heaped at an angle of rest is spontaneously collapsed and extruded radially outwardly into the material transporting space through the gap formed between the lower edge of the inner cylinder and the bottom plate, the pulverulent material being then moved circumferentially within and along the annular transporting space by scrapers or revolving blades to be continuously discharged under gravity through a discharge port formed in the bottom plate, to thereby supply or feed the pulverulent material to a succeeding process constantly at a predetermined discharge or feed rate.

However, in the pulverulent material feeder apparatus of the structure described above, it has been found that the amount or volume of pulverulent material extruded into the annular transporting space through the extrusion gap differs between a location immediately succeeding the discharge port and a location immediately preceding the discharge port, although it depends on particle sizes, shapes, fluidity and the like factors of the pulverulent material charged or supplied into the inner cylinder. More specifically, in a region immediately succeeding the discharge port, the amount of pulverulent material extruded through the gap tends to increase because of rapid formation of an angle of rest for stabilization in this region, resulting in the occurrence of a phenomenon in which the pulverulent material is extruded into the annular transportation space only through a gap portion which is located adjacent to the discharge port at the downstream side thereof with no material being expelled through the remaining gap portion. Of course, such phenomenon may depend on the physical properties of the material, as mentioned above.

This phenomenon obviously contradicts a first-in/first-out uniform feed principle which requires as the premise that the pulverulent material accommodated within the inner cylinder is extruded or expelled through the gap uniformly over the whole circumference thereof, and thus gives rise to such undesirable situation that a heap of the pulverulent material charged in the inner cylinder may undesirably collapse nonuniformly.

Besides, in the pulverulent material feeder apparatuses of the prior art, the bottom is constituted by a flat plate extending horizontally. Consequently, extrusion efficiency becomes lowered as the volume of the pulverulent material within the inner cylinder decreases. Thus, a lot of time is required for completely discharging the material from the feeder apparatus, to a disadvantage. Additionally, another problem is encountered in that residuals of pulverulent material resting on the revolving blades by forming an angle of rest can not be cleared out therefrom.

SUMMARY OF THE INVENTION

In the light of the state of the art, it is an object of the present invention to provide a pulverulent material feeder apparatus in which a pulverulent material charged in an inner cylinder can be extruded radially outwardly into a transporting space through a gap defined between a lower edge of the inner cylinder and a bottom plate uniformly along the whole circumferential extension of the gap, to thereby allow a heap of the pulverulent material within the inner cylinder to collapse uniformly and hence continuous discharge of the material at a uniform or constant rate from a discharge port.

Another object of the present invention is to provide a pulverulent material feeder apparatus in which the aforementioned extrusion efficiency can be protected from lowering even when the amount of a pulverulent material within the inner cylinder becomes small while preventing the pulverulent material expelled into the transporting space from resting on scraper blades, to thereby ensure a uniform discharge rate throughout the pulverulent material feeding operation.

In view of the above objects of the present invention, as well as the other objects which will become apparent as description proceeds, there is provided according to an aspect of the present invention a pulverulent material feeder apparatus which comprises a bottom plate mounted on a stationary frame so as to extend horizontally, an outer cylindrical member mounted on the bottom plate, an inner cylindrical member disposed coaxially within the outer cylindrical member, the inner cylindrical member having an outer peripheral surface defining a material transporting space in cooperation with an inner peripheral surface of the outer cylindrical member and a lower edge defining a material extruding or expelling gap in cooperation with a top surface of the bottom plate, a gap adjusting cylindrical member disposed along the outer peripheral surface of the inner cylindrical member so that vertical position of the gap adjusting cylindrical member can be adjusted, a rotatable shaft disposed at the center of coaxial circles defined by the outer and inner cylindrical members, a rotatable annular member connected to the rotatable shaft through a plurality of spokes so as to extend within the material transporting space along and with a distance from the inner periphery of the outer cylindrical member, a plurality of material transporting scrapers mounted on the rotatable annular member so as to move on and along the bottom plate within the material transporting space, and a material discharge port opened in the material transporting space for discharging externally the pulverulent material, wherein a lower edge of the gap adjusting cylindrical member is formed spirally substantially over a whole circumference thereof with an inclination relative to the plane of the bottom plate so that the material extruding gap is progressively enlarged, starting from the material discharge port, in a direction in which the spokes are rotated or revolved.

According to another aspect of the present invention, there is further provided a pulverulent material feeder apparatus which comprises a bottom plate mounted so as to extend horizontally, an outer cylindrical member mounted on the bottom plate, an inner cylindrical member disposed coaxially within the outer cylindrical member, the inner cylindrical member having an outer peripheral surface defining a material transporting space in cooperation with an inner peripheral surface of the outer cylindrical member and a lower edge defining a material extruding gap in cooperation with an upper surface of the bottom plate, a gap adjusting cylindrical member vertically adjustably disposed along the outer peripheral surface of the inner cylindrical member so that the gap can correspondingly be adjusted, a rotatable shaft disposed at the center of the coaxial circles defined by the outer and inner cylindrical members, a rotatable annular member connected to the rotatable shaft through a plurality of spokes so as to extend within the material transporting space along the inner periphery of the outer cylindrical member, a plurality of material transporting scrapers mounted on the rotatable annular member so as to move on and along the bottom plate within the material transporting space, and a material discharge port opened in the material transporting space for discharging the pulverulent material, wherein a lower edge of the gap adjusting cylindrical member is formed spirally substantially over a whole circumference thereof with an inclination relative to the plane of the bottom plate so that the size of the material extruding gap is minimum at a position adjacent to the material discharge port at the downstream side thereof and is progressively enlarged, starting from the minimum gap portion, in a direction in which the spokes are rotated, and wherein the bottom plate is formed in a bevelled configuration having a center portion protruding upwardly and a lower peripheral portion, the spokes and the rotatable annular member being adapted to revolve about the center line on and along the bottom plate, while the bottom plate is so bent as to extend horizontally within the material transporting space.

These and other objects, features and attendant advantages of the present invention will easily be understood from the following description of the preferred or exemplary embodiments thereof taken in conjunction with the accompanying drawings.

DETAILED DESCRIPTION OF THE PREFERRED EMBODIMENTS

The present invention will now be describerd in detail in conjunction with the preferred or exemplary embodiments thereof by reference to the drawings.

Figure 1:
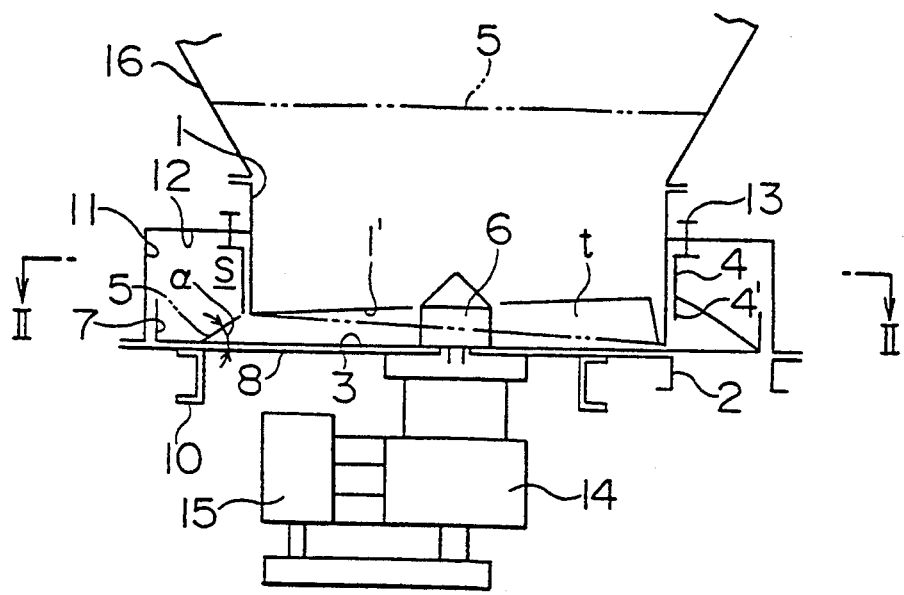
FIG. 1 is a vertical sectional view showing schematically a pulverulent material feeder apparatus according to an embodiment of the present invention.
Figure 2:
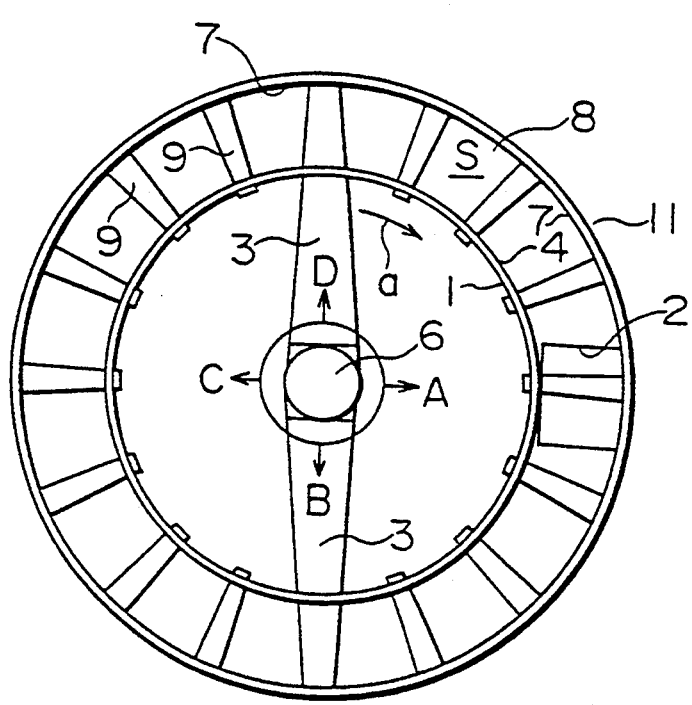
FIG. 2 is a horizontal sectional view of the same taken along a line II—II in FIG. 1.
Figure 3:
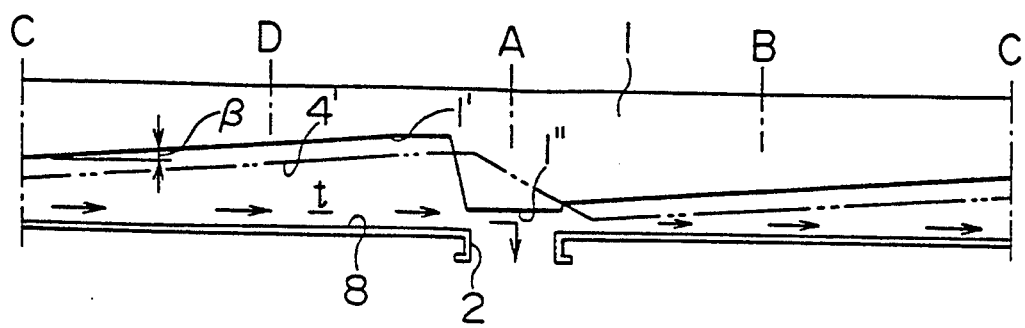
FIG. 3 is a view showing an inner cylinder of the pulverulent martial feeder apparatus in an expanded state as viewed in the directions indicated by arrows A, B, C and D in FIG. 2 and shows oblique and parallel extensions of lower edges of the inner cylinder and a gap adjusting cylinder with an angle of inclination relative to the horizontal.

FIG. 1 is a vertical sectional view showing schematically a structure of a pulverulent material feeder apparatus according to a first embodiment of the present invention. Referring to the figure, the apparatus includes a stationary frame 10 on which a bottom plate 8 having an upstanding outer cylinder 11 mounted thereon is fixedly secured. Disposed coaxially within the outer cylinder 11 is an inner cylinder 1 which is connected to the outer cylinder 11 through an annular flange 12, wherein an annular material transporting space s is defined between the inner peripheral surface of the outer cylinder 11 and the outer peripheral surface of the inner cylinder 1. An extrusion gap t is provided between the bottom plate 8 and the lower edge 1' of the inner cylinder 1 so as to extend substantially along the whole circumference of the lower edge 1'. Further disposed along and around the outer periphery of the inner cylinder 1 is a gap adjusting cylinder 4 for adjusting the extrusion gap t. To this end, the gap adjusting cylinder is vertically movably fitted around the inner cylinder 1 so that the extrusion gap t defined by the lower edge 4' of the adjusting cylinder 4 can be adjusted. A rotatable shaft 6 is provided at the center of the bottom plate 8, i.e., at the coaxial center of the outer and inner cylinders 11 and 1, wherein a rotatable ring or annular member 7 is connected to the shaft 6 by means of spokes 3 serving as material transportation guides. The rotatable annular member 7 is disposed adjacent to and along the inner peripheral surface of the outer cylinder 11 and is provided with a plurality of scrapers 9 at predetermined equi-angular distances therebetween, the scrapers 9 extending radially into the material transporting space s toward the coaxial center along the bottom plate 8. The material transporting space s is in communication with a material discharge opening 2 which is formed in the bottom plate 8. As is apparent from the above, the pulverulent material feeder apparatus according to the instant embodiment of the invention is implemented in the form of a rotational-type pulverulent material feeding machine. The lower edge 1' of the aforementioned inner cylinder 1 is so formed as to extend obliquely upwardly, starting from the position of the material discharge port 2 (i.e., the position A shown in FIG. 3), as viewed in the rotational direction of rotation of the above-mentioned spokes 3 (i.e., the direction indicated by an arrow a in FIG. 2). In other words, the lower edge 1' of the inner cylinder 1 is formed spirally substantially along the whole circumference thereof. (At this juncture, it should however be mentioned that a portion of the lower edge 1' of the inner cylinder 1 which corresponds to the discharge port 2 may be implemented in the form of a flat portion 1" which extends in the horizontal direction so that the gap t becomes minimum at the flat portion 1" of the lower edge 1'.)

Next, the description will be directed to operation of the pulverulent material feeder apparatus according to the first embodiment of the invention.

A pulverulent material 5 is supplied or charged into the inner cylinder 1. By rotating the shaft 6 in the direction indicated by the arrow a (FIG. 2), the annular member 7 is caused to rotate in the same direction through the medium of the spokes 3 which connect the annular member 7 to the shaft 6. Thus, the aforementioned scrapers 9 are revolved in the same direction a along the bottom plate 8 within the space s, such that the material 5 expelled into the space s through the material extrusion gap t, which is adjustable by means of the adjusting cylinder 4, and resting at an angle of rest or repose $\alpha$ is forced to revolve along and within the space s to ultimately be discharged externally of the apparatus through the discharge port 2. Along the circumference of the space s, the extrusion gap t is progressively increased from the discharge port 2 as viewed in the direction indicated by the arrow a, wherein the extrusion gap t is narrowest at the location immediately succeeding the discharge port 2 as viewed in the aforementioned direction a (location B in FIG. 3). Consequently, the amount of extrusion of the pulverulent material 5 at this location B is limited. In other words, a large amount of the material 5 can not be extruded into the space s at the above-mentioned location or region B. However, because the extrusion gap t is progressively enlarged, extrusion of the material 5 is correspondingly increased up to a location immediately preceding the discharge port 2 (i.e., location D). In this way, within the inner cylinder 1, the pulverulent material 5 is forced to move radially outwardly toward the extrusion gap t from the center area under the transporting action of the spokes 3 while sliding in the downward direction uniformly over the whole circumference of the inner cylinder 1.

Figure 4:
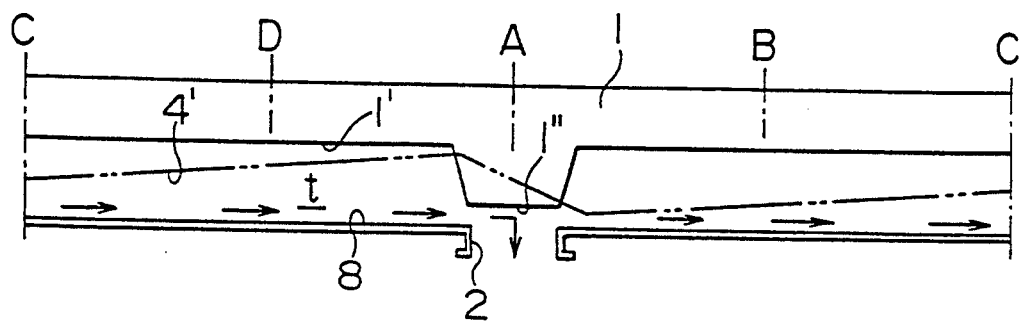
FIG. 4 is an expanded view which corresponds to FIG. 3 except that the lower edge of the inner cylinder is formed horizontally with an angle of inclination of zero while the lower edge of the adjusting cylinder is formed so as to extend obliquely relative to the horizontal.
Figure 5:
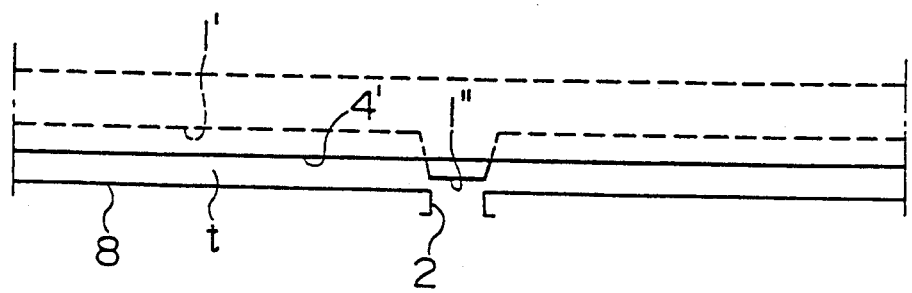
FIG. 5 is an expanded or developed view of the gap adjusting cylinder and shows the same in the state where the lower edges of the inner cylinder and the adjusting cylinder are both formed at an angle of inclination equal to zero.

The angle of inclination $\beta$ can optionally be determined in dependence on the particle size, shape and/or fluidity of the material. More specifically, for a material 5 exhibiting a high fluidity, the angle of inclination $\beta$ should preferably be set at a large value, as exemplified in FIG. 3, while in the case of a material 5 of a low fluidity, the angle of inclination $\beta$ should preferably be selected small or zero (i.e., horizontal), as exemplified in FIG. 4. Such fine adjustment of the size of the extrusion gap t can be realized by positioning correspondingly the lower edge 4' of the adjusting cylinder 4 which is formed spirally so as to extend in parallel with the lower edge 1' of the inner cylinder 1. The fluidity of the material is a factor susceptible to the influence of particle size and/or surface property and/or shape of the pulverized material 5. The lower edge 4' of the gap adjusting cylinder 4 should preferably be so slanted or inclined as to extend in parallel with the lower edge 1' of the inner cylinder 1. Again referring to FIG. 1, reference numeral 13 denotes vertical position adjusting bolts for the adjusting cylinder 4, numeral 14 denotes a reduction gear or transmission, reference numeral 15 denotes a prime mover for driving the rotatable shaft 6 via the transmission 14, and numeral 16 denotes a material charging hopper connected to the inner cylinder 1 at the upper end thereof.

With the structure and the operation of the pulverulent material feeder apparatus described above, the material supplied or charged within the inner cylinder 1 can be extruded or expelled into the space s uniformly substantially along the whole extension of the gap t with all the pulverulent material 5 within the inner cylinder 1 being uniformly transported radially outwardly from the center area of the cylinder 1 toward and into the space s. In this manner, transportation of the pulverulent material 5 into the space s through the extrusion gap t can constantly be effectuated uniformly or evenly in the radially outward direction, whereby a uniform and constant discharge rate of the pulverulent material from the discharge port 2 can be assured.

Figure 7:
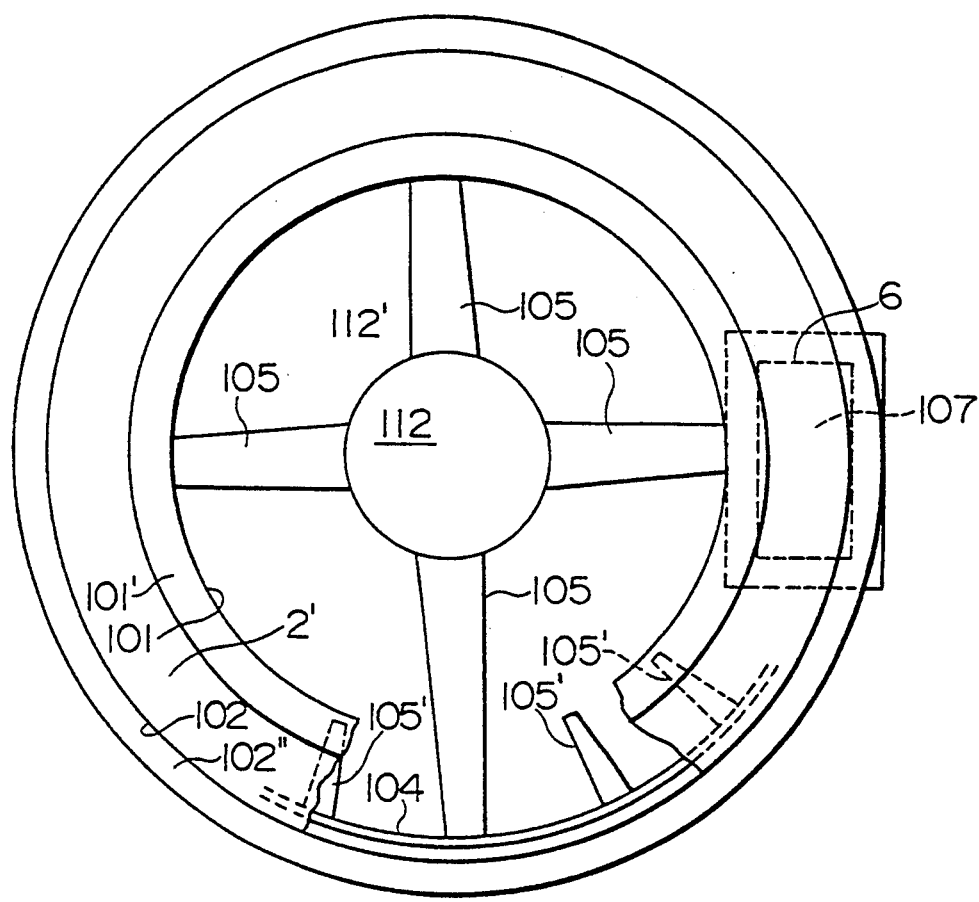
FIG. 7 is a top plan view of the same.
Figure 8:
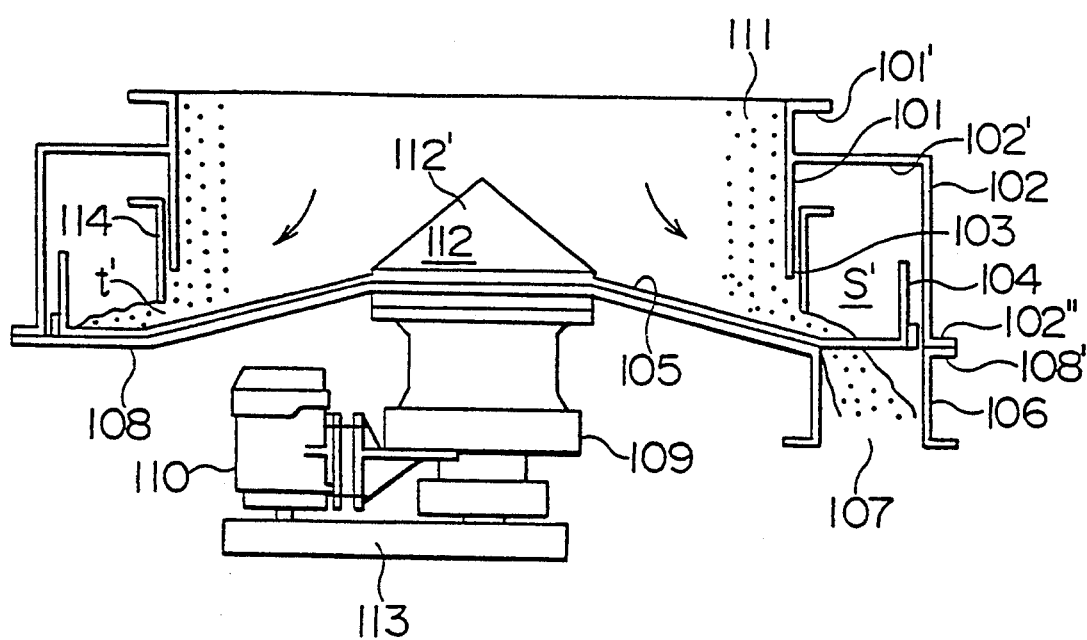
FIG. 8 is a vertical sectional view showing a modification of the pulverulent material feeder shown in FIG. 6.

Next, a pulverulent material feeder apparatus according to a second embodiment of the present invention will be described in detail by reference to FIGS. 6 to 8.

Figure 6:
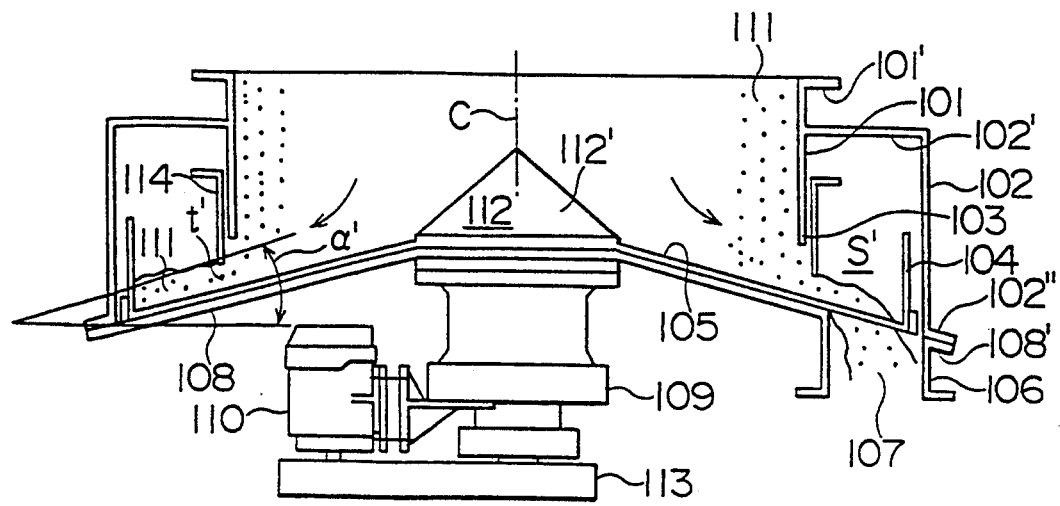
FIG. 6 is a vertical sectional view of a pulverulent material feeder apparatus according to a second embodiment of the invention.

Referring to FIG. 6, in the pulverulent material feeder apparatus according to the second embodiment of the invention, a flange 101' formed at a top end of an inner cylinder 101 is fixedly secured to a flange (which is not shown) formed around a bottom opening of a hopper by means of screws (not shown either). Secured to the outer peripheral surface of the inner cylinder 101 coaxially around a center line c through the medium of a disk-like member 102' is an outer cylinder 102 which has a bottom flange 102" to which a bottom plate 108 is secured along an outer peripheral edge 108' thereof by means of screws (not shown). In that case, a pulverulent material extrusion gap t' is defined between a lower edge 103 of the inner cylinder 101 and the top surface of the bottom plate 108 while a material transporting space s' for transporting the pulverulent material extruded therein from the inner cylinder 101 through the gap t' is formed between the inner cylinder 101 and the outer cylinder 102, wherein a pulverulent material discharge port 107 is opened into the space s'. In the case of the apparatus according to the instant embodiment of the invention, the pulverulent material discharge port 107 is formed in the bottom plate 108 at a suitable pertinent position.

As can be seen from FIG. 6, in the pulverulent material feeder apparatus now under consideration, the bottom plate 108 is implemented approximately in the form of a truncated cone having a center portion protruding upwardly from a lower circular peripheral portion. As a modification of the instant embodiment, the bottom plate 108 may be configured such that the outer peripheral portion thereof is bent horizontally so as to lie flush with the floor level of the transportation space s' (see FIG. 8).

Disposed around and along the circular peripheral surface of the outer cylinder 102 is a rotatable annular member 104, while an upstanding rotatable shaft 112 is disposed at the center of the bottom plate 108, the shaft 112 having a top end portion 112' which projects upwardly so as to form at least approximately a cone-like configuration, wherein the top end portion 112' of the shaft 112 is connected to the rotatable annular member 104 by means of spokes 105 extending along the top surface of the bottom plate 108, so that the annular member 104 can be rotated in one direction by the shaft 112 which in turn is rotated by a driving mechanism such as described hereinbefore in conjunction with the first embodiment of the invention.

Provided in association with the rotatable annular member 104 are a plurality of scraper blades 105' (FIG. 7) which extend radially inwardly so as to transport the pulverulent material 111 extruded into the space s' from the interior of the inner cylinder 101 within and along the annular space or channel s' so that the pulverulent material can be discharged from the discharge port 107 constantly at a predetermined discharge rate.

In the pulverulent material feeder apparatus according to the second embodiment of the invention, a pulverulent material 111 is charged in the inner cylinder 101, and the upstanding shaft 112 is rotated. Then, the pulverulent material 111 is extruded radially outwardly into the space s' defined between the inner cylinder 101 and the outer cylinder 102 through the gap t' formed between the lower edge 103 of the inner cylinder 101 and the top surface of the bottom plate 108 with an angle of rest $\alpha'$ being formed, while released from a load due to gravity of the pulverulent material 111 existing within the inner cylinder 101.

The pulverulent material 111 within the annular space s' is caused to move circumferentially by means of the scraper blades 105' (FIG. 7) rotating about the upstanding shaft 112 to be ultimately discharged from the discharge port 107. Within the inner cylinder 101, the pulverulent material 111 slides downwardly from a center top of the heap of the material 111 toward the lower periphery thereof under the effect of a gradient of gravity. Thus, a progressive decrease in the amount of the pulverulent material 111 accommodated within the inner cylinder 101 will not exert any appreciable influence on the extrusion of the pulverulent material 111 into the channel space s'.

Besides, because of the presence of a sliding force in the direction toward the outer periphery on the bottom plate 108 under the oblique gradient or component of gravity as described above, the pulverulent material 111 resting on the spokes 105 is also expelled therefrom. Thus, such situation in which the pulverulent material resting on the spokes 105 continues to revolve within the inner cylinder 101 together with the spokes can positively be avoided. Besides, the conical surface of the top end portion 112' of the upstanding shaft 112 can promote the downward sliding of the pulverulent material toward the outer periphery of the bottom plate 108 along the bevelled surface thereof.

Again referring to FIG. 6, reference numerals 110 and 109 denote a speed-variable motor and a reduction gear or transmission, respectively, for driving the rotatable upstanding shaft 112, and numeral 113 denotes a protection cover for covering an interconnection between the motor 110 and an input shaft of the transmission 109. Finally, a reference numeral 114 denotes an adjusting cylinder which is used for adjusting the size of the extrusion gap t'.

With the structure of the pulverulent material feeder apparatus described above, the pulverulent material 111 charged into the inner cylinder 101 is inhibited from continuing to revolve about the center line c and is progressively extruded or expelled radially outwardly into the annular space or channel s' through the gap t', such that the heap of the pulverulent material 111 within the inner cylinder 101 progressively collapses uniformly over the whole conical or bevelled surface of the bottom plate, while the pulverulent material expelled into the annular space s' moves circumferentially under substantially no load of the heap and at the angle of rest $\alpha'$, to be ultimately discharged continuously at a predetermined constant discharge rate through the port 107 to be transferred to a succeeding process, without being affected by a decrease in the volume of the pulverulent material heaped within the inner cylinder 101.

In a modification of the pulverulent material feeder apparatus according to the invention, the first and second embodiments described above may be so combined that the inner cylinder has the lower edge formed obliquely or spirally as in the case of the first embodiment with the bottom plate being formed substantially in a truncated-cone-like configuration so that the center portion of the bottom plate 108 lies at a higher level than the outer peripheral portion thereof as in the case of the second embodiment. With this modified structure, substantially the same effects as those of the first and second embodiments can be attained.

We claim:

1. A pulverulent material feeder apparatus, comprising:

a horizontal bottom plate;

an outer cylindrical member mounted on said bottom plate;

an inner cylindrical member disposed coaxially within said outer cylindrical member, a material transporting space being defined between an outer peripheral surface of said inner cylindrical member and an inner peripheral surface of said outer cylindrical member, and a material extruding gap being defined between a lower edge of said inner cylindrical member and a top surface of said bottom plate;

a gap adjusting cylindrical member disposed along the outer peripheral surface of said inner cylindrical member for adjusting the effective size of said material extruding gap;

a rotatable shaft disposed coaxially of said outer and inner cylindrical members and having a predetermined rotation direction;

a rotatable annular member rotatably mounted within said material transporting space;

a plurality of radially extending spokes connecting said rotatable annular member to said rotatable shaft such that rotation of said rotatable shaft causes said annular member to rotate within said material transporting space;

a plurality of material transporting scrapers mounted on said rotatable annular member so as to move on and along said bottom plate within said material transporting space upon rotation of said rotatable shaft and said rotatable annular member;

wherein a material discharge port is formed in said bottom plate to allow pulverulent material in said material transporting space to be discharged externally; and wherein a lower edge of said gap adjusting cylindrical member is formed in a spiral shape over substantially a whole circumference thereof with an inclination relative to the plane of said bottom plate so that the effective size of said material extruding gap is progressively enlarged, starting from said material discharge port, as viewed in said rotation direction of said rotatable shaft.

2. A pulverulent material feeder apparatus according to claim 1, wherein said lower edge of said inner cylindrical member is formed so as to extend substantially in parallel with said lower edge of said gap adjusting cylindrical member.

3. A pulverulent material feeder apparatus according to claim 1, wherein
said bottom plate is formed in a substantially conical configuration having a lower peripheral portion and a center portion protruding above said lower peripheral portion.

4. A pulverulent material feeder apparatus according to claim 3, wherein
said bottom plate is bent in such a manner that it is flat and extends horizontally within said material transporting space.

* * * * *